United States Patent [19]
Akita

[11] Patent Number: 5,896,786
[45] Date of Patent: Apr. 27, 1999

[54] WIRE STRIPPING APPARATUS AND WIRE STRIPPING METHOD

[75] Inventor: Hirokazu Akita, Yamagata, Japan

[73] Assignees: Yazaki Corporation, Tokyo, Japan; Japan Chain Terminal Co., Ltd., Kanagawa, Japan

[21] Appl. No.: 08/800,111

[22] Filed: Feb. 13, 1997

[30] Foreign Application Priority Data

Feb. 16, 1996 [JP] Japan ..................................... 8-029533

[51] Int. Cl.⁶ ...................................................... H02G 1/12
[52] U.S. Cl. .............................................. 81/9.41; 81/9.51
[58] Field of Search .............................. 81/9.4, 9.51, 9.41

*Primary Examiner*—D. S. Meislin
*Attorney, Agent, or Firm*—Sughrue, Mion, Zinn, Macpeak & Seas, PLLC

[57] ABSTRACT

A wire stripping apparatus includes: a first cam and an external gear which are fixedly secured to a rotary shaft; a slider which is movable horizontally with respect to the first cam; a base stand secured to the slider; a pair of cutter holders which are provided on the base stand in such a manner that they are vertically movable; an internal gear which is rotatably provided through intermediate gears in the external gear; a second cam which is secured to the internal gear, and has a cam groove which is symmetrical in a 180° rotation mode; and a pair of swing levers which have followers, and are engaged with the cutter holders in such a manner that the latter are horizontally slidable. Thee second cam comprises: first, second, third cam surfaces which are gradually larger in height. More specifically, in the second cam, a pair of the first cam surfaces, a pair of the second cam surfaces, and a pair of the third cam surfaces are arranged symmetrical in a 180° rotation mode. With respect to an abutment protrusion provided on said slide, positioning cams in the form of plural stages are provided on a select shaft. In a wire stripping method, the cutters operate to cut the cover near the end of the wire, and then the cutters are retracted to strip the wire halfway. Thereafter, the cutters is slightly moved forwardly, and then the conductor is cut.

9 Claims, 9 Drawing Sheets

WIRE STRIPPING APPARATUS AND WIRE STRIPPING METHOD

BACKGROUND OF THE INVENTION

1. Field of the Invention

This invention relates to a wire stripping apparatus, and a wire stripping method.

2. Background

Figure 12:
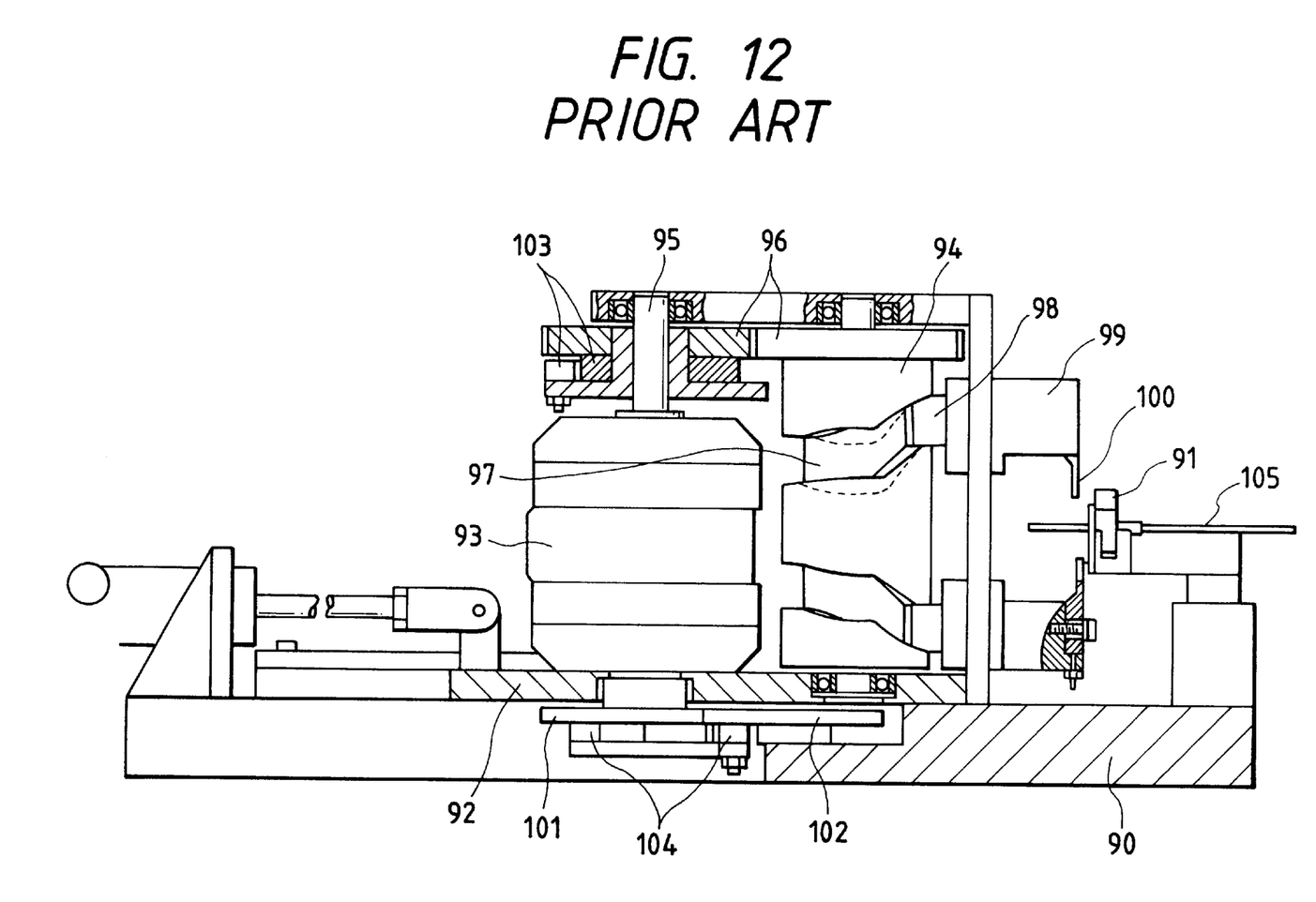
FIG. 12 is a side view, with parts cut away, showing a conventional wire stripping apparatus.

A conventional wire stripping apparatus disclosed by Unexamined Japanese Patent Publication No. Sho. 55-68808 is as shown in FIG. 12.

The conventional apparatus includes: a wire clamp 91 set on a base board 90; a movable board 92 which is movable with respect to the base board 90; an electric motor 93 which is rotatable both in the forward direction and in the reverse direction and is fixedly mounted on the movable board 92; a cylindrical cam 94 which is also mounted on the movable board 92; a pair of gears 96 which connects the upper end portion of the motor shaft 95 to the cylindrical cam 94; a pair of cutter holders 99 having followers 98 engaged with cam grooves 97 formed in the cylindrical cam 94; a cutter 100; a plate cam 101 connected to the lower end of the motor shaft 95; and a cam receiver 102 mounted on the base board 90 with respect to the plate cam 101.

Figure 13A:
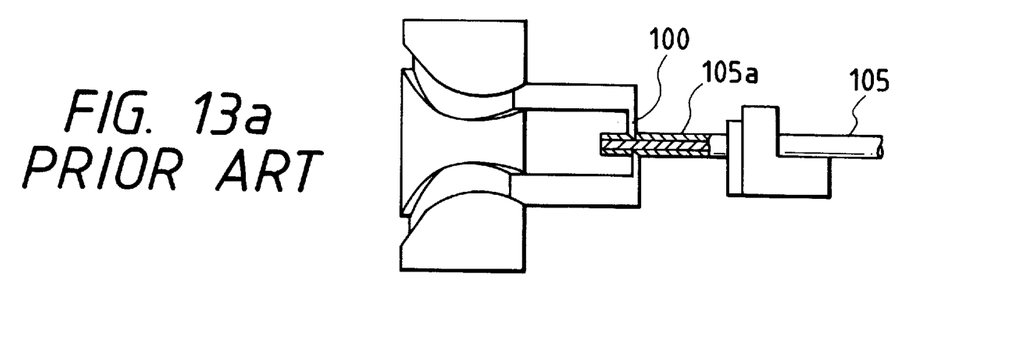
FIG. 13a and FIG. 13b are side views for a description of a wire stripping operation with the conventional apparatus.

The motor 93, when rotated in the forward direction, transmits its torque through a ratchet 103 to the gear 96, and, when rotated in the reverse direction, transmits the torque through a ratchet 104 to the plate cam 101. As the motor 93 is rotated in the forward direction, the cylindrical cam 94 is turned, so that the cutter 100 is moved upwardly. As the motor is turned in the reversed direction, the cutter 100 is moved back and forth together with the movable plate 92. When the cutter is closed, as shown in FIG. 13a the insulating cover 105a of the wire 105 is cut; and as the cutter is moved backwardly, the wire 105 thus cut is removed; that is, the cover 105a thus cut is removed from the wire 105. In the step shown in FIG. 13b, the cutter is closed to cut the exposed conductor 105b of the wire 105.

The above-described apparatus suffers from the following problems.

As was described above, when the motor 93 is rotated in the forward direction, the cutter is moved up and down; and when the motor 93 is rotated in the reverse direction, the cutter is moved back and forth together with the movable board 92. Hence, the wire stripping operation takes a relatively long period of time. Furthermore, the cylindrical cam 94 for moving the cutter 100 up and down, and the plate cam 101 for moving the cutter back and forth are driven respectively through the ratchets 103 and 104. Hence, the resultant wire stripping apparatus is intricate in structure, large in size, and high in manufacturing cost.

Figure 13B:
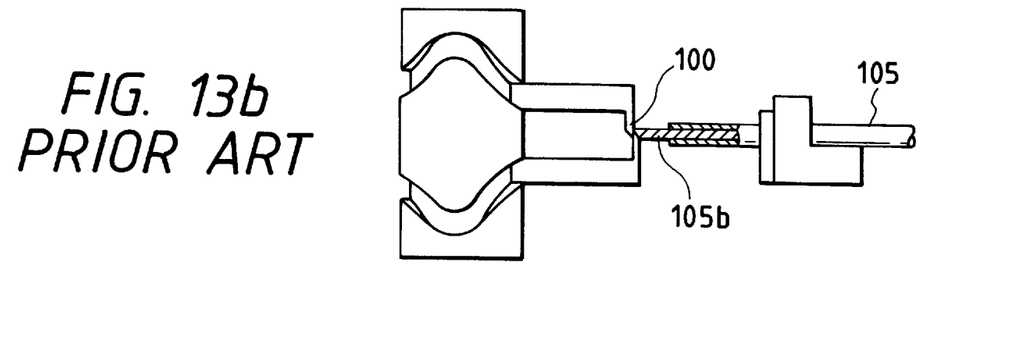
Figure 14A:
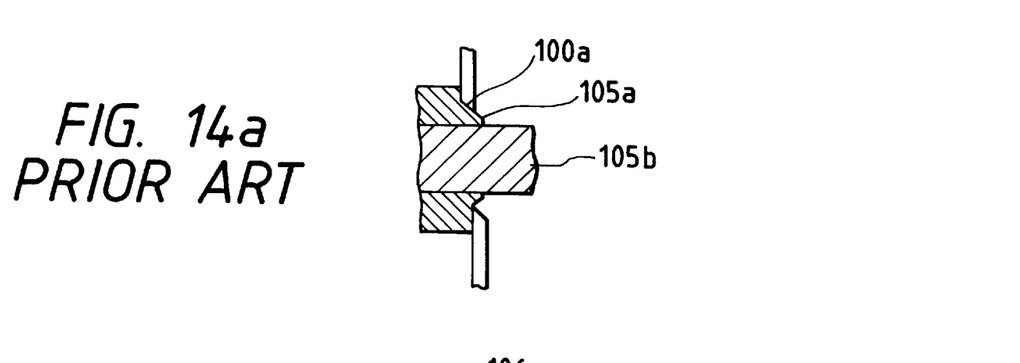
FIG. 14a and FIG. 14b are vertical sectional views for a description of difficulties accompanying the conventional wire stripping apparatus.
Figure 14B:
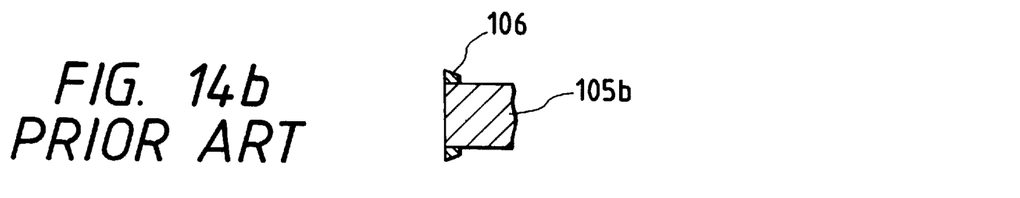

Furthermore, when the exposed conductor 105b is cut as shown in FIG. 13b, the insulating cover 105a springs back along the sloped surfaces of the cutter blades 100a as shown in FIG. 14a, thus being caused to go inwardly. As a result, a cover waste 106 in the form of a ring remains on the end portion of the conductor 105b. This may be due to the following fact: If, in the case where the cover 105a is to be cut as shown in FIG. 13a, the cover 105a is completely cut, then the conductor 105b is damaged. In order to overcome this difficulty, the cover 105a was not completely cut.

SUMMARY OF THE INVENTION

In view of the foregoing, the objects of the invention are to provide a wire stripping method in which a wire is stripped with high working efficiency, prevent cover waste from remaining on the conductor, and provide a wire stripping apparatus compact in size which practices the method.

The foregoing objects and other objects of the invention are achieved by the following apparatus and method:

The wire stripping apparatus includes:

a first cam and an external gear which are fixedly secured to a rotary shaft;

a slider which has a follower engaged with the first cam, and is movable horizontally back and forth;

a base stand secured to the slider;

a pair of cutter holders which are provided on the base stand in such a manner that the cutter holders are vertically movable, and have cutters, respectively;

an internal gear which is rotatably provided through intermediate gears in the external gear;

a second cam which is secured to the internal gear, and has a rotationally symmetrical cam groove; and a pair of swing levers which have first ends at which followers are provided, and the remaining second ends with which the cutter holders are engaged in such a manner that the cutter holders are horizontally slidable.

In the apparatus, the first cam includes a first convex surface continuous with a relief surface; a concave surface continuous with the first convex surface; and a second convex surface which is continuous with the concave surface and is lower in cam height than the first convex surface. Further, the second cam includes a first cam surface small in height; a second cam surface which is continuous with the first cam surface and is larger in height than the first cam surface; and a third cam surface which is continuous with the second cam surface, and is larger in height than the second cam surface.

Furthermore, in the wire stripping apparatus, the internal gear has a pitch circle diameter which is twice as large as the pitch circle diameter of the internal gear, and the cam groove is symmetrical in a 180° rotation mode. Besides, a pair of the first cam surfaces, a pair of the second cam surfaces, and a pair of the third cam surfaces are arranged symmetrical in a 180° rotation mode.

Moreover, the wire stripping apparatus further includes an abutment protrusion provided on the slider, positioning cams arranged in plural stages, said positioning cams each having a plurality of cam surfaces on periphery thereof, one of said cam surfaces confronting said abutment protrusion, and a select shaft for moving said positioning cams, rotatably and vertically.

The a wire stripping method includes: a step of cutting the cover of a wire near the end of the wire with a pair of cutters; a step of retracting the cutters along the axis of the wire to strip the wire halfway; a step of slightly moving the cutters in the direction opposite to the wire stripping direction; and a step of closing the cutters to cut the conductor of the wire.

The above-described wire stripping apparatus operates as follows: The first cam drives the slider, whereby the cutter holders together with the base stand are moved in the wire stripping direction. On the other hand, the second cam swings the pair of levers vertically, whereby the cutter holders are moved in the wire cutting direction. The speed of the second cam is half (½) of the speed of the first cam because of the difference in diameter between the external gear and the internal gear. Therefore, while the cutters are reciprocated once along the axis of the wire by one revolution of the first cam, the two levers together with the cutters are opened and closed once by means of the second cam, to strip the wire.

When the follower of the slider is in contact with the relief surface of the first cam and the followers of the levers are in contact with the second cam surfaces of the second cam, the cutters are at the reference positions. When the followers of the levers are brought into contact with the second cam surfaces of the second cam, the cutters are closed to cut the cover of the wire. When the follower is brought into contact with the first convex surface of the first cam, the cutter is retracted to remove the cover thus cut. When the follower is brought into contact with the concave surface, the cutters are slightly returned forwardly. When the followers are brought into contact with the third cam surfaces of the second cam, the cutters are further closed to cut the conductor. When the follower is brought into contact with the first convex surface of the first cam, the cutters are further retracted to remove the cover waste.

Before the conductor is cut, the cutters are slightly returned forwardly, so that the cutters are left from the cover. Hence, the apparatus is free from the difficulty that, when the conductor is cut, the cover is also cut; that is, with the apparatus, the problem has been solved that the cover waste remains on the conductor.

DETAILED DESCRIPTION OF THE PREFERRED EMBODIMENT

A preferred embodiment of the invention will be described with reference to the accompanying drawings.

FIGS. 1 through 4 show an example of a wire stripping apparatus according to the invention.

The apparatus 1 includes: a driving source, namely, an electric motor 2; a one-way clutch 4 to which the rotation of the motor 2 is transmitted through an endless belt 3; a drive body 6 connected to the rotary shaft 5 of the clutch 4; and a wire clamp 7 which clamps the end portion of an electric wire 8. Those components 2 through 7 are accommodated in a cover 9.

Figure 2:
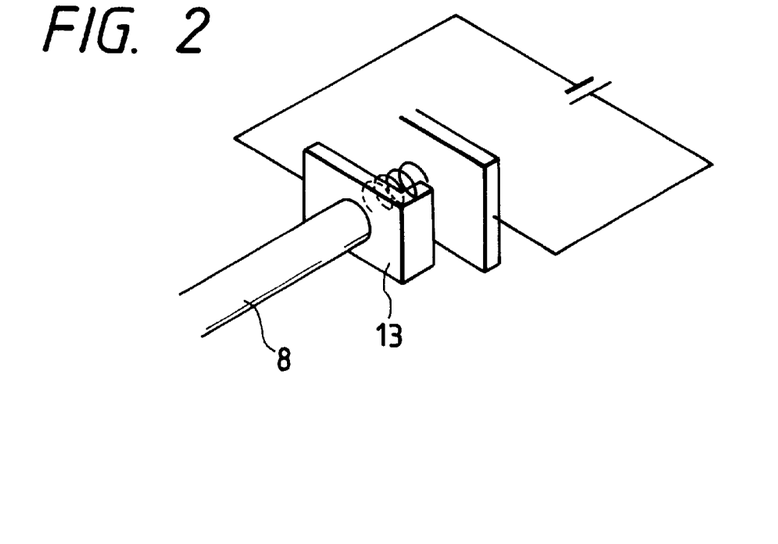
FIG. 2 is a perspective view showing a wire detecting switch in the wire stripping apparatus.
Figure 3:
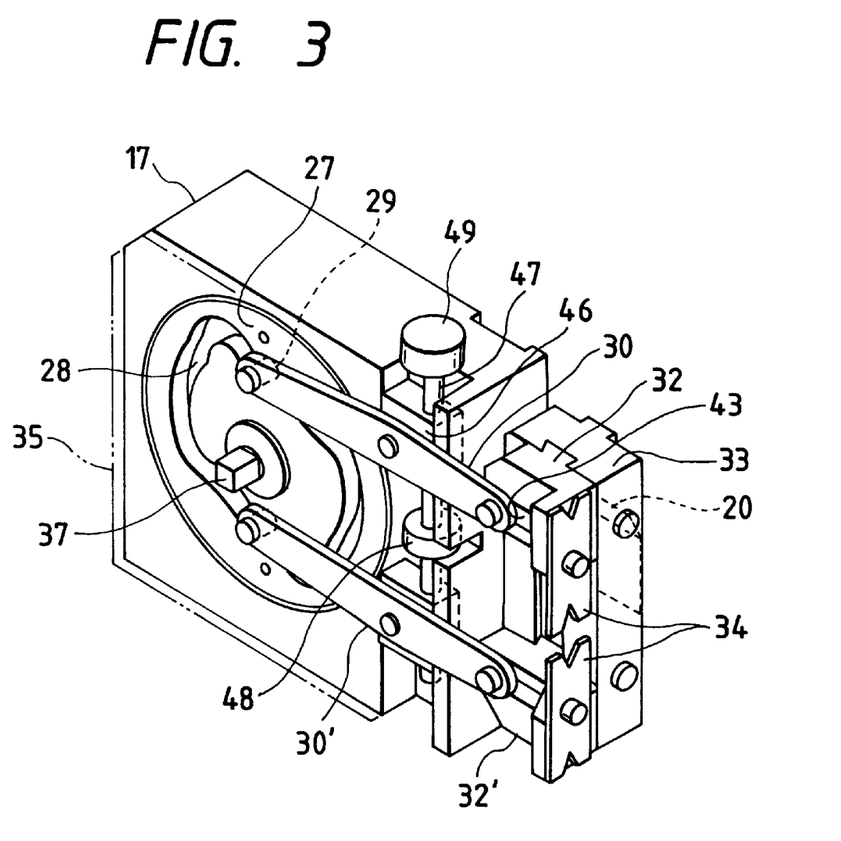
FIG. 3 is a perspective view showing the front of the wire stripping apparatus.

The motor 2 is an ordinary one which is rotated in one direction at all times. The clutch 4 is of a mechanical type. When the clutch makes one revolution, the end portion of a lever 11 is abutted against a step of a cam 10, so that the lever 11 is locked. The lever is unlocked by a solenoid 12. The solenoid 12 is activated when the end portion of a wire to be stripped is abutted against a switch 13 as shown in FIG. 2. The power source is 100V. The wire clamp 7 has a pair of clamping pawls 15 which are vertically moved by a chuck cylinder 14.

Figure 4:
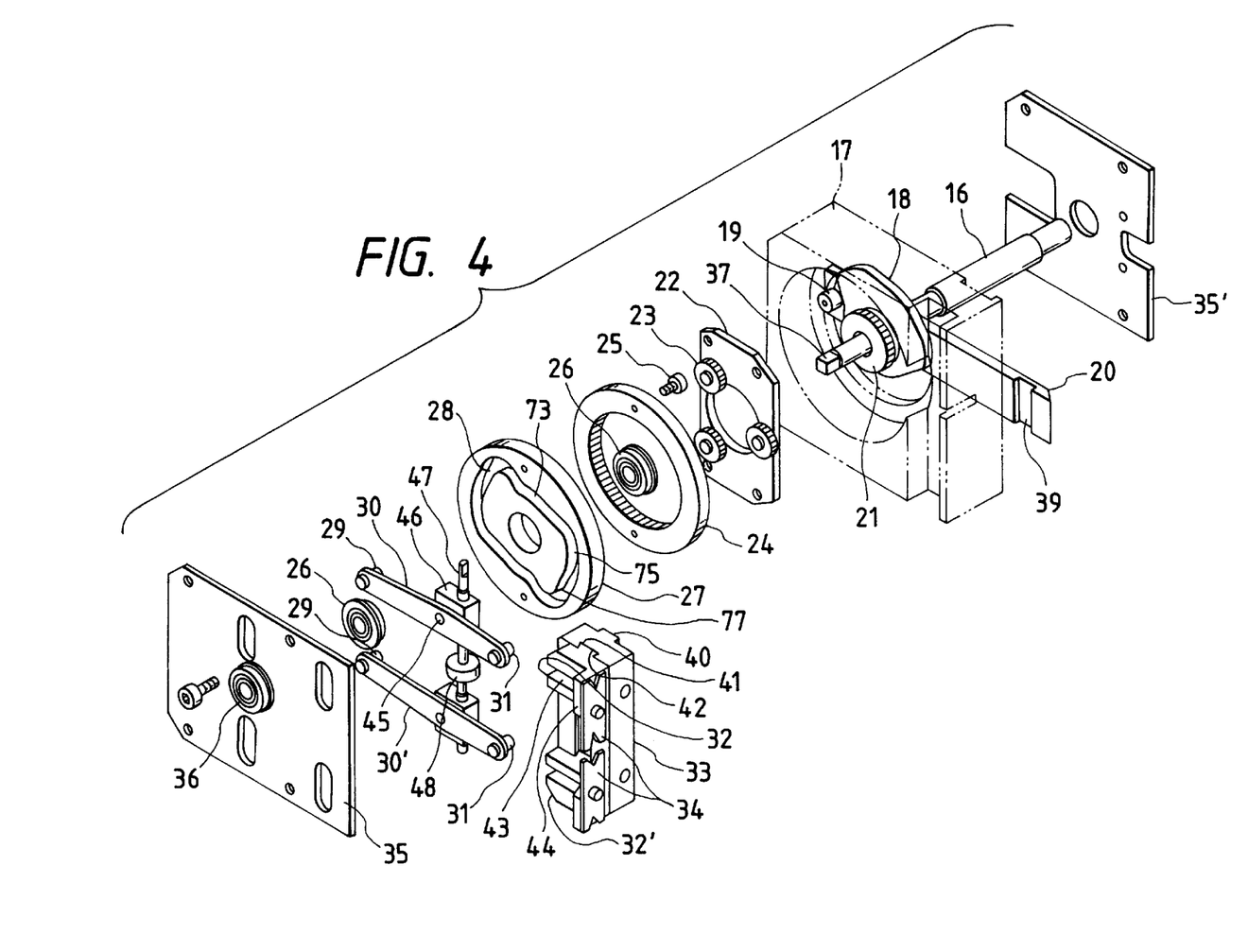
FIG. 4 is an exploded perspective view showing a drive body in the wire stripping apparatus.

The drive body 6, as shown also in FIG. 4, includes: a rotary shaft (or input shaft) 16 which is coaxially connected to the hollow rotary shaft 5 of the clutch 4; a first cam 18 which is substantially sector-shaped and fixedly secured to the rotary shaft 16 with a key; a driven slider 20 which has a follower 19 engaged with the first cam 18 and is reciprocated horizontally (in a direction perpendicular to the rotary shaft); an external gear 21 which is secured to the rotary shaft 16 with a key in such a manner that it is adjacent to the first cam 18; a plurality of (three in this embodiment) small intermediate gears (planet gears) 23 which are arranged around the external gear 21 at equal angular intervals and rotatably supported on a base board 22 which is secured to the casing 17; an annular internal gear 24 which is engaged with the intermediate gears 23 and has a pitch diameter twice as large as that of the external gear 21 to reduce the rotational speed of the rotary shaft 16 in half; a disk-shaped second cam 27 which is secured to the internal gear 24 with bolts 25, and supported through a bearing 26 on the rotary shaft 16; a pair of swing levers (or driven levers) 30 and 30' which have followers 29 at the ends which are engaged with a cam groove 28 which is formed in the second cam 27 in such a manner that it is symmetrical in a 180° rotation mode, the swing levers 30 being vertically swingable; a pair of upper and lower cutter holders 32 and 32' which are horizontally slidably engaged with pins 31 on the remaining ends of the aforementioned swing levers 30 and 30', and are moved up and down in accordance with swing of the lever 30; and a moving stand 33 which supports the cutter holders 32 and 32' in such a manner that the cutter holders 32 and 32' are vertically slidable, and which is secured to the front end portion of the aforementioned driven slider 20.

Cutters 34 are fixedly secured to the side surfaces of the cutter holders 32 and 32' with bolts. The cutter holders 32 and 32' are engaged with a pair of guide bars 86 (FIG. 1) which are protruded from the casing 17 in such a manner that they are horizontally slidable. The pair of cutters 34 are opened and closed as the levers 30 and 30' swing; and they are moved longitudinally of the wire (or horizontally) as the driven slider 20 moves back and forth. The above-described components 18 through 30 are accommodated in the casing 17, which is closed with front and rear covers 35 and 35'. The external gear 21 and the intermediate gears 23 are set inside the annular internal gear 24. The disk-shaped second cam 27 is secured to the internal gear 24, so that the two levers 30 and 30' can be swung with the second cam 27. This feature makes the drive system compact especially in the direction of thickness (in the longitudinal direction of the rotary shaft). Hence, the casing 17 is considerably small in width. The external gear 21, the intermediate gears 23, and the internal gear 24 form an epicyclic reduction gear mechanism.

Figure 1:
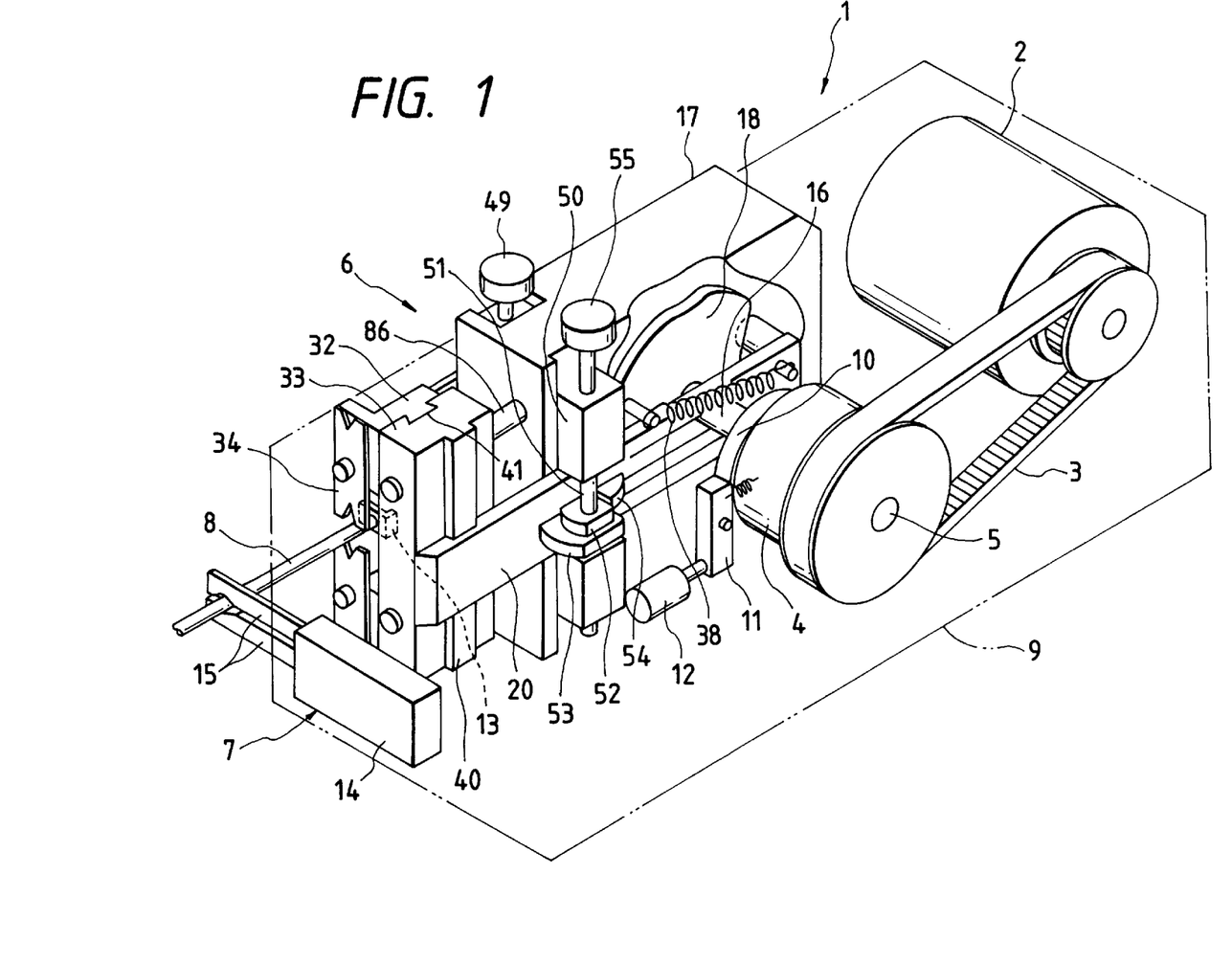
FIG. 1 is a perspective view showing the internal structure of a wire stripping apparatus according to the invention.

The front end portion of the rotary shaft 16 is supported through a bearing 36 by the cover 35, in such a manner that a rotary shaft end portion 37 is protruded from the cover 35. The rotary shaft end portion 37 is rectangular in section, and therefore the wire 8 can be manually (without the use of the motor 2) stripped by turning the rotary shaft 16 with a lever (not shown). As shown in FIG. 1, the driven slider 20 is urged by a tension coil spring 38 forwardly (in the direction opposite to the direction in which the wire is stripped). One end of the tension coil spring 38 is connected to the rear end portion of the slider 20, and the other end is secured to a stationary part on the side of the casing 17.

The driven slider 20 is slid along the casing 17 until a half of the driven slider is protruded from the casing 17. The slider 20 has a vertical groove 39, with which an elongated protrusion 40 of the moving stand 33 is fixedly engaged with bolts (not shown). A vertical dovetail groove 41 is formed in the front end portion of the moving stand 33. The dovetail groove 41 is slidably engaged with elongated protrusions 42 of the pair of cutter holders 32 and 32'. The cutter holders 32 and 32' have horizontal slide grooves 43 with which the pins 31 at the ends of the swing levers 30 and 30' are slidably engaged, and vertical side walls 44 to which the cutters 34 are secured.

The upper and lower swing levers 30 and 30' are swingable, and are each in the form of a thin plate. The swing levers 30 and 30' have the pins 31 at the front ends in such a manner that the pins 31 are extended horizontally, and the pin-shaped followers 29 at the base ends in the same manner. The middle portions of the levers 30 and 30' are swingably supported through shafts 45 on the upper and lower slides block 46, respectively. As shown also in FIG. 3, the slide blocks 46 are threadably engaged with a vertical threaded shaft 47, and are coupled to the casing 17 with the aid of a central disk 48. A dial 49 is fixedly mounted on top of the threaded shaft 47. The dial 49 is turned to adjust the distance between the upper and lower levers 30 and 30'; i.e., the distance between the cutters 34 and 34. In this connection, a cutting depth is determined according to a given wire diameter.

In FIG. 1, on the side opposite to the side where the dial 49 is provided, a mechanism for adjusting the position of the driven slider 20 is provided. The mechanism includes: a vertical shaft (a select shaft) 51 which penetrates the upper and lower boards 50 protruded from the casing 17, and is rotatably and vertically movable; two positioning cams 52 and 53 mounted on the middle of the shaft 51 in a stacked fashion; an abutment protrusion 54 of the driven slider 20 which is confronted with the cam 52; and a dial 55 secured to the top of the shaft 51.

Figure 5A:
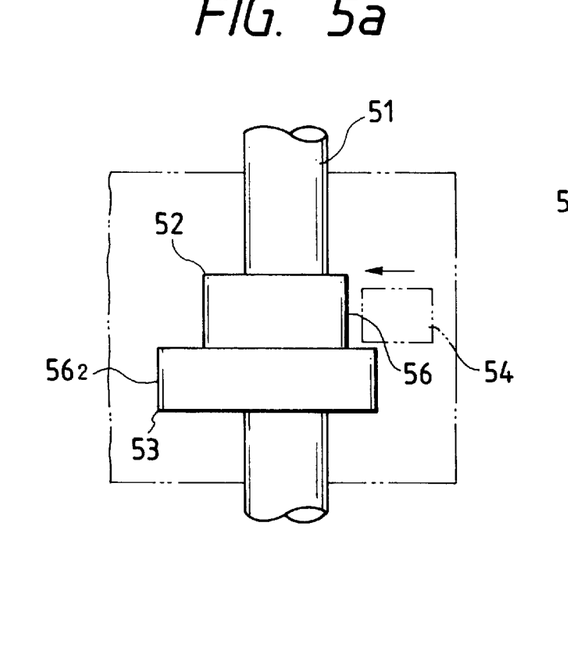
FIG. 5a and FIG. 5b are a side view and a plan view of a slider position adjusting mechanism.
Figure 5B:
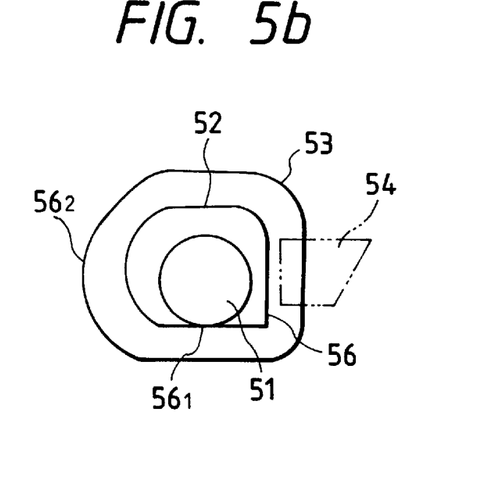

As shown in FIGS. 5a and 5b, each of the cams 52 and 53 has a plurality of cam surfaces (four cam surfaces in the embodiment, for convenience in manufacture) 56, and the distances of the cam surfaces 56 from the center of the shaft 51 are different little by little (for instance at intervals of 0.5 mm). However the upper cam 52 and the lower cam 53 are similar to each other, the minimum cam height of the lower cam 53 is larger for instance by 0.5 mm than the maximum cam height of the upper cam 52.

When the dial 55 is turned and vertically moved together with the shaft 51, the cam surface 56 can be efficiently selected with respect to the abutment protrusion 54. As shown in FIGS. 5a and 5b, if the protrusion 54 is abutted against the low cam surface $56_1$, the cutters 34 together with the slider 20 are moved forwardly (cf. FIG. 1), and the wire stripping length is set to a large value. Reversely, if the protrusion 54 is abutted against the high cam surface, the wire stripping length is set to a small value. The protrusion 54 is abutted against the cams 52 and 53 by the resilient force of the spring 38. By stacking a plurality of cams 52 and 53, the cam selecting mechanism is simplified, which makes the apparatus compact.

Figure 6A:
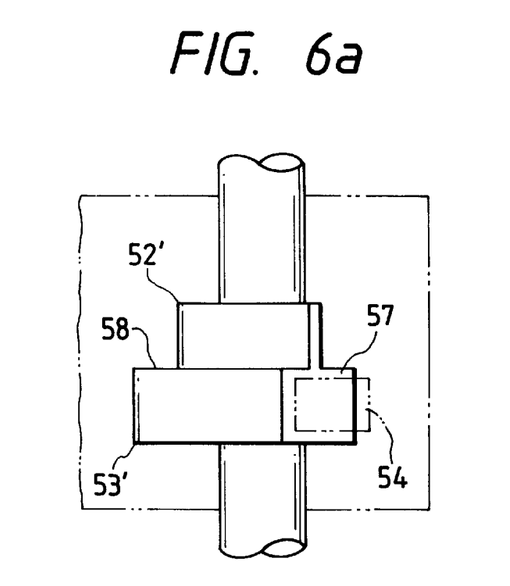
FIG. 6a and FIG. 6b are a side view and a plan view showing one modification of the slider position adjusting mechanism.
Figure 6B:
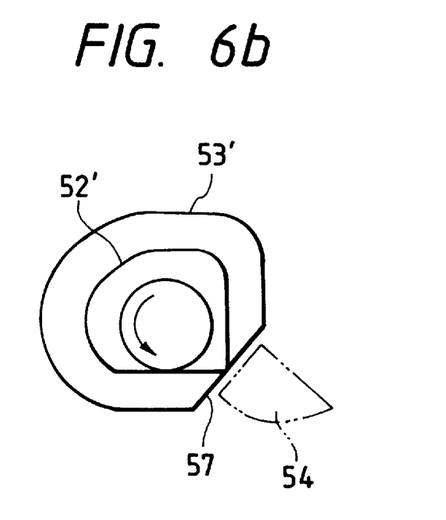

FIGS. 6a and 6b show the upper and lower cams 52' and 53' whose corners are cut into a straight or tapered surface 57. The formation of the surface 57 eliminates a step 58 with respect to the abutment protrusion 54. This feature makes it unnecessary to retract the slider 20 to space the protrusion 54 from the cam 52 when it is required to switch the upper and lower cams.

Figure 7:
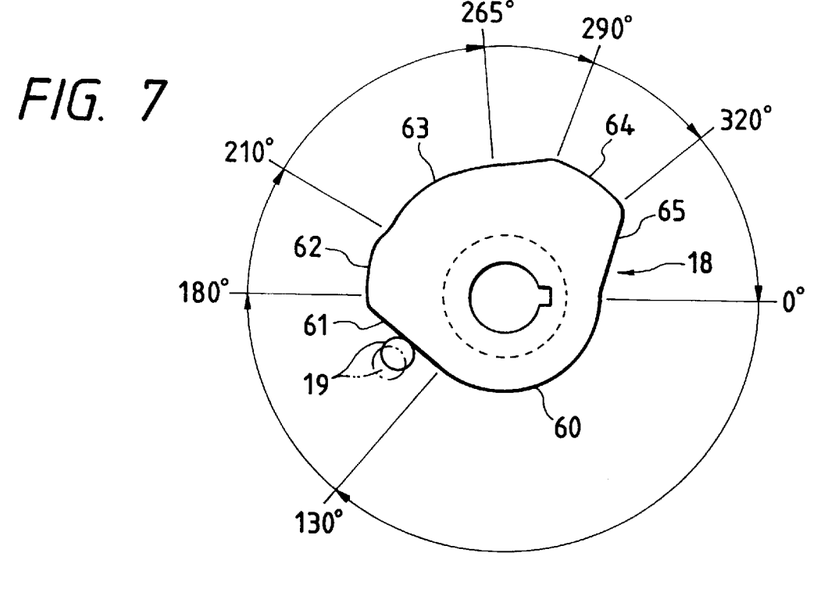
FIG. 7 is a plan view of a first cam in the apparatus.

FIG. 7 shows the first cam 18 which drives the slider 20.

The first cam 18 includes: an arcuate relief surface 60 minimum in cam height; a first sloped surface 61 continuous with the relief surfaced 60; a first convex surface which is continuous with the first sloped surface 61 and is arcuately curve; a concave surface 63 which is arcuate and continuous with said first convex surface 62 and is lower than the first convex surface 62; a second convex surface 64 which is arcuate and continuous with the concave surface 63 in such a manner that it is higher than the first convex surface 62; and a second sloped surface 65 between the second convex surface 64 and the aforementioned relief surface 60.

Figure 9A:
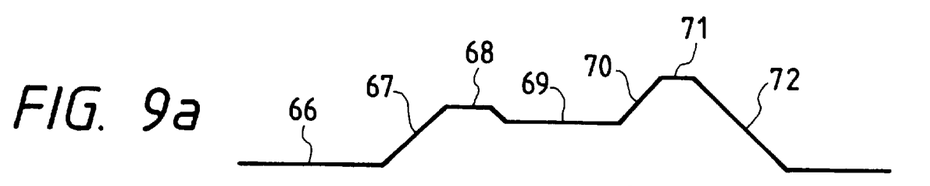
FIG. 9a and FIG. 9b are diagrams showing the follower displacements with angles of the first and second cams, respectively.

FIG. 9a is to describe the movement of the follower 19 with respect to the first cam 18.

Figure 10A:
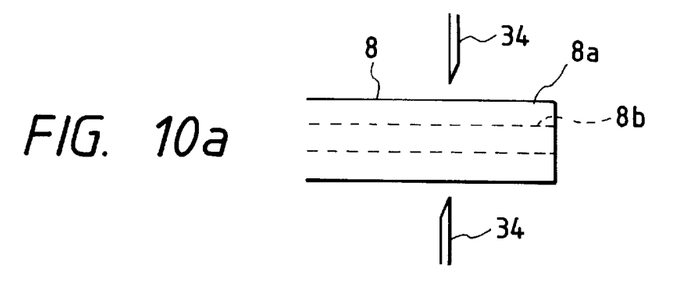
FIGS. 10a through 10f are side views showing wire stripping steps in order.
Figures 10B, 10C:
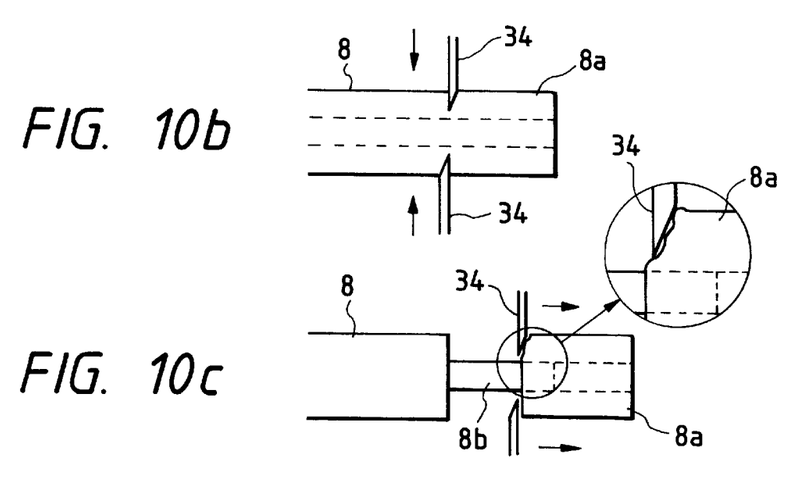

In a range of rotation of from 0° to 130°, the follower 19 is at rest along the relief surface 60 as indicated by the base line 66. Under this condition, the cutters 34 are located at the farthest position as shown in FIG. 10a. Next, in the range of rotation of from 130° to 180°, the follower 19 (FIG. 7) is abruptly moved on the sloped surface 61 as indicated by the sloped line 67 shown in FIG. 9a in a wire stripping direction (backwardly), and the follower is held at rest as indicated by the horizontal line 68 shown in FIG. 9a being on the first convex surface 62. At this time, the cutters 34 remove the cover 8a of the wire 8 as shown in FIG. 10c.

Next, the follower 19 is dropped to the concave surface 63 shown in FIG. 7, and is held at rest as indicated by the horizontal line 69 shown in FIG. 9a in a range of rotation of from 210° to 265°. At this time, the cutters 34 are slightly returned forwardly (i.e. in the direction opposite to the wire stripping direction). Next, the follower 19 is placed on the second convex surface 64 shown in FIG. 7, so that, in a range of rotation of from 290° to 320°, the follower 19 is greatly moved backwardly as indicated by the sloped line 70 and the horizontal line 71 shown in FIG. 9. At this time, the cutters 34 are retracted to remove the cover waste 8c as shown in FIG. 10f. In the final step, in a range of rotation of from 320° to 0° (360°), the follower 19 is moved along the second sloped surface 65 shown in FIG. 7; that is, it is returned to the original position, and accordingly the cutters 34 are returned to the original positions as shown in the part FIG. 10a as indicated by the sloped line 72 shown in FIG. 9a.

Figure 10D:
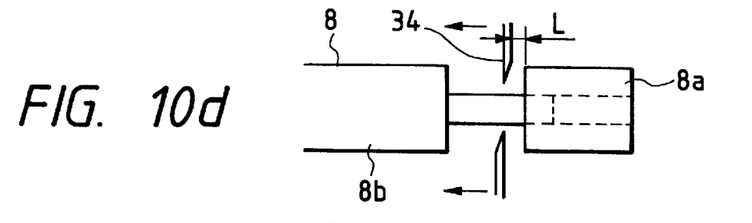

Due to the concave surface 63 of the first cam 18, the cutters 34 are slightly displaced by a distance L in the forward direction (opposite to the wire stripping direction) as shown in the FIG. 10d. This feature prevents a cover waste in the form of a ring from remaining on the end portion of the conductor.

The contact height of the cam follower 19 shown in FIG. 7 with respect to the relief surface 60 of the first cam 18 is determined by the positioning cams 52 and 53 (FIGS. 1 and 5). For instance, when the cam surface $56_2$, which has a maximum cam height in FIG. 5, is brought into contact with the protrusion 54, the follower 19 is spaced apart from the relief surface as indicated by the chain-line in FIG. 7, thus being slowly brought into contact with the sloped surface 61 and the first convex surface 62. Hence, the wire stripping stroke is shortened.

Figure 8:
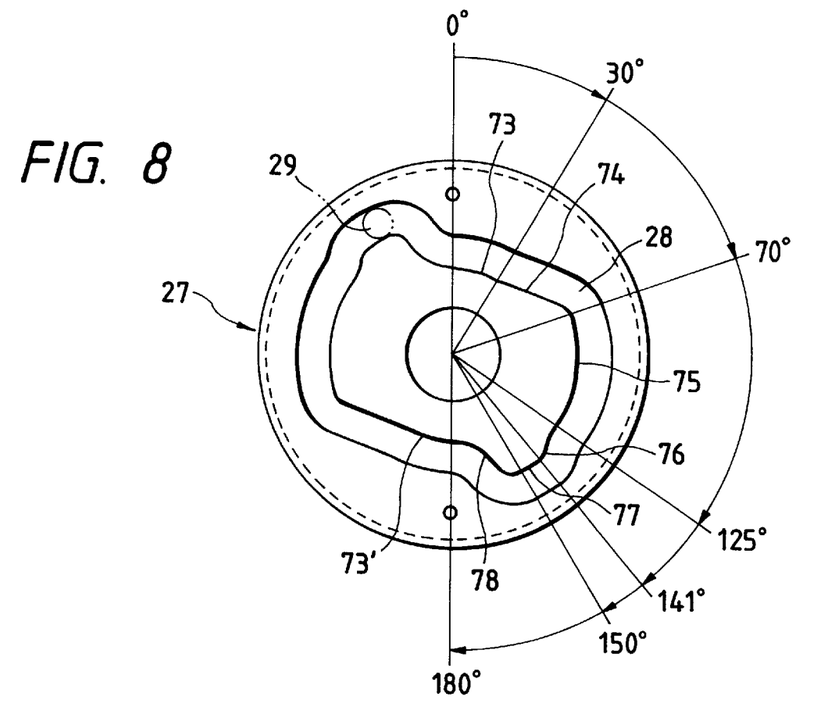
FIG. 8 is a plan view of a second cam in the apparatus.

FIG. 8 shows the second cam 27 which opens and closes the cutters 34.

The rotational speed of the second cam 27 is half of the rotational speed of the first cam 18 because of the difference in pitch circle diameter between the external gear 21 and the internal gear 24 in FIG. 4. Hence, the two levers 30 and 30' can be opened and closed simultaneously with one second cam 27 applied to one first cam 18. Because only one second cam 27 is applied to the first cam, the drive system is compact. It the epicyclic reduction gear mechanism were not employed, two second cams would be required, and the follower 29 of the lever 30 would be elongated. As a result, the following would vibrate. Furthermore, the apparatus would be bulky. The groove 28 in the second cam 27 is engaged with the followers 29 provided at the base ends (on the side opposite to the side where the cutters 34 are provided) of the two levers 30 and 30'.

The cam groove 28 of the second cam 27, as shown in FIG. 8, includes: a first arcuate surface (a first cam surface) 73 which is minimum in cam height and covers a range of rotation of from 0° to 30°; a first sloped surface 74 which is gradually larger in cam height and covers a range of rotation of from 30° to 70° and is relatively long; a second arcuate surface (a second cam surface) 75 which is extended from the first sloped surface, and is constant in cam height over a range of rotation of from 70° to 125°; a second sloped surface 76 which is gradually larger in cam height over a range of rotation of 125° to 141° and is relatively short; a third arcuate surface (a third cam surface) 77 which is extended from the second sloped surface 76 and is constant in cam height over a range of rotation of from 141° to 150°; and a third sloped surface 78 which is gradually smaller in cam height over a range of rotation of from 150° to 180°.

Furthermore, in the second cam 27, the above-described surfaces 73 through 78 are formed again over the remaining range of rotation of 180° to 360° (0°) in such a manner that they are symmetrical with the firstly mentioned ones in a 180° rotation mode. That is, the cam groove 28 of the second cam 27 is made up of two parts which are symmetrical with each other in a 180° rotation mode. The two parts are engaged with the followers 29 and 29 of the upper and lower levers 30 and 30', respectively. Thus, the levers 30 and 30' are moved symmetrically.

Figure 9B:
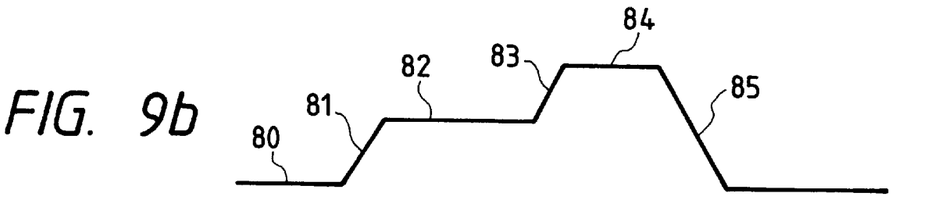

With the first arcuate surface 73, the cam follower 29 is held at rest as indicated by the base line 80 shown in FIG. 9b, and the cutters 34 and 34 are wide opened vertically as shown in FIG. 10a. Next, with the first sloped surface 74 in FIG. 8, the follower 29 is raised as indicated by the sloped line 81 in FIG. 9b (the follower 29 of the lower lever 30' is moved downwardly), so that the cutters 34 are closed as shown in FIG. 10b to cut the cover 8a of the wire 8. With the second arcuate surface 75 in FIG. 8, the follower 29 is held at rest as indicated by the horizonal line 82 in FIG. 9b. In this case, as shown in FIG. 9a, the follower 19 of the first cam 18 is moved in the wire stripping direction, and the wire stripping operation is carried out as shown in FIG. 10c.

Figure 10E:
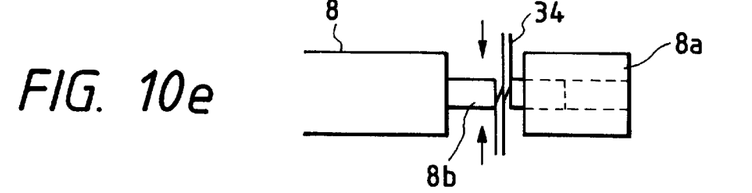
Figure 10F:
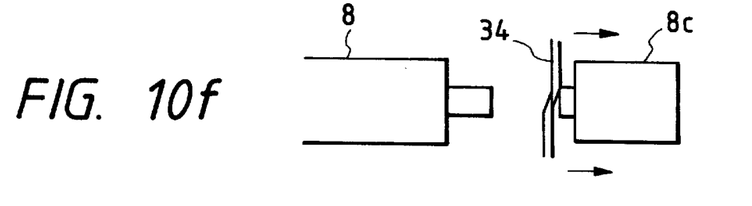

Next, the follower 19 is slightly returned as shown in FIG. 9a, and with the cutters 34 somewhat returned in the direction opposite to the wire stripping direction as shown in FIG. 10d, the follower 29 is maximumly moved upwardly (or downwardly) with the aid of the second sloped surface 76 and the third arcuate surface 77 in FIG. 8, and in correspondence to the sloped line 83 and the horizontal line 84 in FIG. 9b, the upper and lower cutters 34 and 34 lap each other as shown in FIG. 10e, to cut the conductor 8b of the wire 8. Next, in correspondence to the sloped line 70 in FIG. 9a, the cutters 34 are moved in the cover waste removing direction as shown in FIG. 10f. Thereafter, with the aid of the third sloped surface 78 in FIG. 8, the cutters 34 are opened in correspondence to the sloped line 85 in FIG. 9b, and returned to the original positions.

Figure 11:
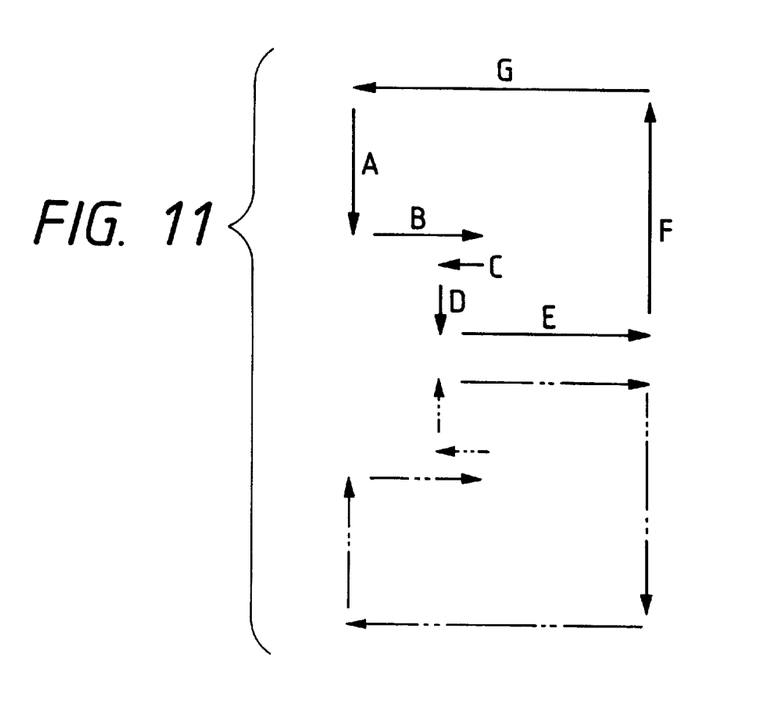
FIG. 11 is an explanatory diagram for a description of the operation of the cutters.

FIG. 11 is to describe the movement of the upper and lower cutters 34. In FIG. 11, the movement of the upper cutter 34 is indicated by the solid lines; and the movement of the lower cutter is indicated by the chain lines.

First, in the movement A, the cutters are closed halfway to cut the cover 8a of the end portion of the wire 8 as shown in FIG. 10b. Thereafter, in the movement B, the cutters 34 are retracted to strip the wire as shown in FIG. 10c. Next, in the movement C, the cutters 34 are returned in the direction opposite to the wire stripping direction, so that, as shown in FIG. 10d, the cutters 34 are displaced in the forward direction a distance L. Hence, the apparatus, unlike the conventional ones prevents that an annular cover waste from remaining on the conductor. Under this condition, the cutters are closed deeply to cut the conductor 8b of the wire 8, in the movement D.

In the above-described wire stripping operation, the cut cover 8a is stripped, and then the conductor 8b is cut. Hence, the length of the exposed conductor is accurately regulated; that is, the wire stripping operation is carried out with high work efficiency.

Thereafter, in the movement E, the cutters 34 are retracted to remove the cut waste 8c as shown in FIG. 10f. The cut waste 8c includes a cut cover 8a and a cut conductor 8b, and therefore the cut waste 8c is scarcely scattered; that is, it can be readily collected. Finally, in the movements F and G, the cutters are returned to the original positions; that is, the cutters are positioned vertically opened as shown in FIG. 10a. The wire 8 is manually set between the cutters 34 and 34, and held between the clamping pawls 15 and 15 as shown in FIG. 1.

As was described above, in the wire stripping apparatus of the invention, the first cam for moving the cutters in the wire stripping direction and the second cam for moving the cutter in the wire cutting direction are coaxially mounted on the rotary shaft, and the epicyclic reduction gear mechanism is formed inside the internal gear integral with the second cam, and, with respect to the first cam, the two levers are swung with the one second cam. Hence, the apparatus is compact, and can be carried with ease, and can be readily used at any place. Furthermore, in the apparatus of the invention, unlike the conventional one in which the motor is driven in the opposite direction to drive two cams separately, the two cams are rotated at the same time. This feature enhances the wire stripping efficiency, and increases the productivity. Furthermore, in the apparatus of the invention, before the conductor of the wire is cut, the cutters are shifted in the direction opposite to the wire stripping direction, which eliminates the difficulty that, when the conductor is cut, the cover waste remains thereon.

What is claimed is:

1. A wire stripping apparatus, comprising:

a support;

a rotary shaft mounted for rotation on said support;

a first cam and an external gear fixedly secured to said rotary shaft;

a slider mounted on said support for movement in a wire stripping direction with respect to said support, said slider having a follower engaged with said first cam;

a base stand secured to said slider;

a pair of cutter holders mounted on said base stand for movement in a cutting direction with respect to said base stand;

a plurality of intermediate gears engaged with said external gear;

an internal gear engaged with said plurality of said intermediate gears;

a second cam having a rotationally symmetrical cam groove, said second cam secured to said internal gear; and a pair of swing levers mounted for rotation on said support, each of said pair of swing levers having (1) a follower engaged with said cam groove, and (2) an end engaged with a respective one of said pair of cutter holders to impart movement in said cutting direction thereto, but not inhibit a movement of said respective one of said pair of cutter holders in said wire stripping direction.

2. The wire stripping apparatus of claim 1, wherein said first cam includes:

a first convex surface being continuous with a relief surface;

a concave surface being continuous with said first convex surface; and a second convex surface which is continuous with said concave surface and is lower in cam height than said first convex surface; and said second cam includes:

a first cam surface being small in height;

a second cam surface which is continuous with said first cam surface and is larger in height than said first cam surface; and a third cam surface which is continuous with said second cam surface, and is larger in height than said second cam surface.

3. The wire stripping apparatus of claim 2, wherein said internal gear has a pitch circle diameter which is twice as large as a pitch circle diameter of said external gear, and said cam groove is symmetrical in a 180° rotation mode, and includes a pair of said first cam surfaces, a pair of said second cam surfaces, and a pair of said third cam surfaces symmetrically arranged in a 180° rotation mode.

4. The wire stripping apparatus of claim 1, further comprising:

an abutment protrusion provided on said slider;

a select shaft mounted on said support for rotation and for movement in said cutting direction; and positioning cams provided on said select shaft, said positioning cams each having a plurality of cam surfaces on a periphery thereof, one of said cam surfaces abutting said abutment protrusion.

5. The wire stripping apparatus of claim 1, wherein each of said pair of cutter holders includes a slot extending in said wire stripping direction, and said end of each of said pair of swing levers includes a pin inserted into said slot of a respective one of said pair of cutter holders.

6. The wire stripping apparatus of claim 1, further including:

a pair of cutters provided respectively on said pair of cutter holders; and a wire clamp for holding a wire between said pair of cutters.

7. The wire stripping apparatus of claim 1, further including a tension spring having one end fixed to said support and another end fixed to said slider to urge said follower of said slider against said first cam.

8. The wire stripping apparatus of claim 1, wherein central portions of said pair of swing levers are mounted for rotation on said support, and said followers of said pair of swing levers are provided on ends thereof opposite said ends engaged with said pair of cutter holders.

9. The wire stripping apparatus of claim 1, wherein said cutting direction is perpendicular to said wire stripping direction.

* * * * *